(12) United States Patent
Dohle et al.

(10) Patent No.: US 9,956,737 B2
(45) Date of Patent: May 1, 2018

(54) DEVICE AND METHOD FOR THE PRODUCTION OF FRICTION LININGS AND BRAKE LININGS

(71) Applicant: TMD Friction Services GmbH, Leverkusen (DE)

(72) Inventors: Achim Dohle, Leverkusen (DE); Sabrina Lesch, Meerbusch (DE)

(73) Assignee: TMD Friction Services GmbH, Leverkusen (DE)

( * ) Notice: Subject to any disclaimer, the term of this patent is extended or adjusted under 35 U.S.C. 154(b) by 0 days. days.

(21) Appl. No.: 14/441,588

(22) PCT Filed: Sep. 18, 2014

(86) PCT No.: PCT/EP2014/069881
§ 371 (c)(1),
(2) Date: May 8, 2015

(87) PCT Pub. No.: WO2015/044023
PCT Pub. Date: Apr. 2, 2015

(65) Prior Publication Data
US 2016/0297161 A1 Oct. 13, 2016

(30) Foreign Application Priority Data

Sep. 24, 2013 (DE) .................. 10 2013 110 530

(51) Int. Cl.
*B30B 15/06* (2006.01)
*B30B 11/02* (2006.01)
(Continued)

(52) U.S. Cl.
CPC ............ *B30B 15/064* (2013.01); *B30B 11/02* (2013.01); *F16D 69/00* (2013.01); *F16D 69/025* (2013.01);
(Continued)

(58) Field of Classification Search
CPC ................................ B29C 43/00; B29C 35/00
See application file for complete search history.

(56) References Cited

U.S. PATENT DOCUMENTS 3,754,499 A 8/1973 Heisman et al.
3,795,473 A 3/1974 Holik
(Continued)

FOREIGN PATENT DOCUMENTS

CH           498714 A     11/1970
CN     202097980 U     1/2012
(Continued)

OTHER PUBLICATIONS

Barnstead International, 2006-2007 Barnstead International Laboratory Products Catalog, 2006-2007, Barnstead International, pp. 144-147.*

(Continued)

*Primary Examiner* — Matthew J Daniels
*Assistant Examiner* — Kelsey C Grace
(74) *Attorney, Agent, or Firm* — Rogowski Law LLC

(57) ABSTRACT

The present invention relates to a pressing tool for the production of friction linings for motor vehicles, whereby the pressing tool has a mold, a die and a mirror plate, whereby the die and the mirror plate have separate ceramic heating plates that come into contact with the pressing material during the pressing procedure, whereby profile plates can additionally be placed on the heating plates of the pressing die, said profile plates then being in contact with the pressing material during the pressing procedure.

12 Claims, 2 Drawing Sheets

(51) Int. Cl.
*F16D 69/00* (2006.01)
*F16D 69/02* (2006.01)

(52) U.S. Cl.
CPC ............... *F16D 2250/0023* (2013.01); *F16D 2250/0092* (2013.01)

(56) References Cited

U.S. PATENT DOCUMENTS

| | | | |
|---|---|---|---|
| 3,998,573 A | | 12/1976 | Gilbert et al. |
| 4,049,090 A | * | 9/1977 | Buell .................... F16D 65/125 |
| | | | 188/251 M |
| 4,874,564 A | | 10/1989 | Sudani et al. |
| 4,968,468 A | * | 11/1990 | Leinweber .............. B30B 11/34 |
| | | | 100/226 |
| 5,073,099 A | | 12/1991 | Kayano |
| 5,531,943 A | | 7/1996 | Sudani et al. |
| 7,837,924 B2 | | 11/2010 | Chiba |
| 9,370,884 B2 | | 6/2016 | Kuwahara |
| 2005/0023271 A1 | * | 2/2005 | Saito .................... B60N 2/3011 |
| | | | 219/452.11 |
| 2006/0272762 A1 | | 12/2006 | Chiba et al. |
| 2011/0198170 A1 | * | 8/2011 | Turani .................. C04B 35/571 |
| | | | 188/250 B |

FOREIGN PATENT DOCUMENTS

| | | |
|---|---|---|
| DE | 1965168 A1 | 12/1971 |
| DE | 2445574 A1 | 4/1975 |
| DE | 102005050087 A1 | 7/2006 |
| DE | 102010031421 A1 | 1/2012 |
| DE | 102010031421 B4 | 4/2013 |
| EP | 0274702 A1 | 7/1988 |
| EP | 0386652 A1 | 9/1990 |
| EP | 1098104 A2 | 5/2001 |
| EP | 2684695 A1 | 1/2014 |
| JP | 2002-046161 A | 2/2002 |
| JP | 2004174806 A | 6/2004 |
| JP | 2005-111763 A | 4/2005 |
| JP | 2006334916 A | 12/2006 |
| WO | WO 2010104129 | 9/2010 |

OTHER PUBLICATIONS

Translation of Mar. 28, 2017 Office Action issued in JP 2015-558508.
Search Report dated Dec. 2, 2016 in CN Application No. 201480002502.6.
Office Action dated Dec. 2, 2016 in CN Application No. 201480002502.6.
Int'l Preliminary Report on Patentability dated Mar. 29, 2016 in Int'l Application No. PCT/EP2014/0698810.

* cited by examiner

DEVICE AND METHOD FOR THE PRODUCTION OF FRICTION LININGS AND BRAKE LININGS

CROSS-REFERENCE TO RELATED APPLICATIONS

This application is a national stage application (under 35 USC § 371) of PCT/EP2014/069881, filed Sep. 18, 2014, which claims benefit of German application No. 10 2013 110 530.0, filed Sep. 24, 2013.

BACKGROUND OF THE INVENTION

Technical Field and State of the Art

The invention relates to a device and to a method for the production of friction linings and brake linings.

Brake linings that have a carrier plate (friction lining carrier) and a friction lining placed thereupon are employed in a wide variety of realms, but especially in the automotive industry and there, particularly for trucks and passenger cars, as a consequence of which they are produced in large numbers. In this context, all kinds of carrier plates and friction linings are used which differ markedly from each other in terms of their size, shape, thickness and the material used, since almost every vehicle model has different brake linings.

The carrier plate normally consists of a metal, sheet-metal or cast part. The friction lining is made of a granular, fibrous and/or granulate pressing material that can be shaped. Conventional lining compounds contain metals, fillers, slip agents and lubricants as well as organic components such as, for instance, resins, rubber, organic fibers and organic fillers. The compositions of the lining are adapted as a function of the various design parameters and operating parameters and of the desired friction value. The employed synthetic resins or phenol resins serve as binders for solidifying and cross-linking the friction lining mixture during the pressing procedure and/or during the subsequent hardening of the friction lining.

The production of the friction and brake linings is carried out essentially by means of the following steps:

a) A defined amount of the friction lining mixture that is to be pressed is filled into the pressing mold and the carrier plate is placed onto the pressing mold. The press in then closed, that is to say, a heated metal plate—hereinafter referred to as a mirror plate—is placed onto the carrier plate in such a way that the requisite compacting pressure between the mirror plate and the heated pressing die can be built up. Then, the compound is pressed onto the carrier plate using a pressing die or piston under exposure to elevated pressure and elevated temperature. In this context, the carrier plates can have a special surface texture, which permits an even better bonding between the carrier plate and the actual friction lining. In addition, the carrier plates are provided with a special adhesive or a so-called bonding agent, which is likewise intended to ensure a strong bond between the carrier plate and the actual friction lining, thus creating a mechanically strong and stable brake lining.

The binders employed, usually resins, melt at the elevated temperature of the pressing procedure, thereby gluing and (chemically) cross-linking the other constituents of the lining mixture in order to form a homogeneous, strong and compact friction lining compound.

b) Alternatively, first of all, a so-called preform is made. This is done essentially as described in a), except that no carrier plate is placed onto the pressing mold. During serial production, the friction material compound is compacted in the pressing mold or molds between the heated mirror plate and the heated pressing die. After the pressing procedure has been completed, the preform thus created is removed from the pressing mold and later pressed onto the lining carrier (the carrier plate) in a subsequent or second step. The remarks made under a) regarding the surface texture of the carrier plate and the use of a bonding agent apply to the pressing of this preform accordingly.

In the above-mentioned method variants, the pressing mold, the die and the mirror plate are heated electrically. In variant a), the carrier plate that has been placed into or onto the pressing mold is situated, for example, in a recess in a metal block that likewise has heating means, as a result of which this carrier plate is heated indirectly.

The method variant a) is described in detail, for example, in German patent application DE 199 53 438 A1 and especially illustrated in FIGS. 1 and 2 and presented in the appertaining explanations in columns 3 and 4. Here, explicit reference is made to the disclosure of this preliminary published application, and its contents are hereby also considered to be part of the description presented here.

The above-mentioned preliminary published application describes a die plate that has a multilayered structure. On the pressing side of the die plate, there is a familiar pressure plate, which has axis-parallel holes and is thus permeable to the gases and vapors that are formed during the pressing procedure of the friction lining mixture. On this pressure plate, there is a layer of porous material that faces outwards and that later comes into contact with the friction lining mixture. This material has narrow permeable pores through which vaporous and gaseous substances can pass to the pressure plate side. These pores, in turn, are dimensioned to be so small that even small particles of the pressing material are held back.

As elaborated upon, in the methods according to the state of the art, the pressing mold, the die, the mirror plate and the carrier plate that has been placed into or onto the mold are electrically heated directly or indirectly, usually by means of cartridge heaters and/or heating tapes. This has the drawback that the temperature can fluctuate over the heated surface by as much as 40° C. [72° F.]. Since the mentioned parts of the pressing tool are made of steel, large amounts of metal have to be heated so that the stored energy of the friction material or of the pressing material mixture can be heated before and during the pressing procedure. For one thing, this system is very slow, whereby 20 seconds of dead time during the regulation are a common occurrence. Depending on the design of the heating means employed, on the temperature measurement, which is a function of the design, and on the inertia of the entire system in view of the necessity for temperature regulation, for example, a constant temperature cannot be ensured over the surface of the die or of the die plate.

Furthermore, the pressing method and the pressing tool described do not operate energy-efficiently since the amount of energy that is available to heat the friction material is small relative to the total energy consumption that, in the final analysis, is determined by the heating of the steel employed for the various parts of the pressing tool.

Before this backdrop, the invention is based on the objective of putting forward a pressing method and a pressing tool or a pressing device which largely avoid the above-mentioned disadvantages of the state of the art.

BRIEF SUMMARY OF THE INVENTION

This objective is achieved by a method for the production of friction linings in which a friction lining mixture is compacted in a pressing tool having a pressing mold or mold, a die, a mirror plate as its bottom or as a placement surface for one or more molds so as to create a friction lining, said method being characterized in that the die and the mirror plate of the pressing tool are heated by a heating plate or else they have a heating plate.

Such a pressing tool or pressing device is likewise a subject matter of the present invention.

The stamp and the mirror plate are each heated by a preferably ceramic heating plate. This heating plate is placed on the pressing side on the mirror plate and on the die (to be more precisely, on the die plate), it is then electrically heated, and it is preferably electrically and/or thermally insulated vis-á-vis the metal of the mirror plate and the die plate. The insulation is provided, for instance, by the heating plate itself or by an additional ceramic intermediate plate situated under the ceramic heating plate as seen in the pressure direction. The electric connections preferably run axis-parallel in the direction facing away from the preform, analogously to the actually installed heating system. During the pressing procedure, these heating plates on the mirror plate and on the die plate are in direct contact with the friction material that is to be pressed.

The configuration of the heating surfaces or heating plates in terms of their mechanical (pressure) and electric properties (heating output, surface temperature) can be adapted to the friction linings that are to be produced, whereby said linings can differ markedly from each other, for example, with respect to the mixture of friction material employed, their density, and thus with respect to the process parameters needed for their production.

Generally, the friction lining mixture (the pressing material) is pressed at a temperature of 70° C. to 200° C. [158° F. to 392° F.], preferably at 80° C. to 140° C. [176° F. to 300.2° F.]. The pressing procedure can be carried out at a cycle of 50 sec to 250 sec, preferably 70 sec to 140 sec. As a rule, the compacting pressures are in the range from 15 $N/mm^2$ to 40 $N/mm^2$.

Preferred embodiments of the heating plates according to the invention and their arrangement are presented below:

The thickness of the heating plates according to the invention is preferably between 3 mm and 10 mm. An example of a possible material for the heating plates according to the invention is silicon nitride, although any other ceramic heating elements or materials can be used. The heating output is preferably between 100 W and 10,000 W. According to the invention, the heating plates can also consist of several individual ceramic heating elements. Other advantages of the ceramic heating elements according to the invention are compressive strengths of approximately 2000 MPa, a modulus of elasticity of about 300 GPa as well as extreme resistance to mechanical wear and tear and a practically negligible intrinsic deformation up to approximately 1000° C. [1832° F.]. Other aspects are a surface output of up to about 150 $W/cm^2$ and extremely short heating times, resulting in a fast and precise regulation without dead times as well as in low residual heat and in a low thermal mass which, in turn, positively influences the regulation behavior.

The ceramic heating plates on the pressing side of the die or on the die plate can be made of a porous material that allows gases and vapors that are formed during the pressing procedure—but no particles of pressing material—to pass through so that they can then be discharged from the pressing tool, for instance, through openings in the adjoining die plate. Such an arrangement without a heating plate according to the invention is described, for example, in FIGS. 1 and 2 of German patent application DE 199 53 438 A1; see columns 3 and 4, especially column 3, lines 15 to 40.

In the pressing tool according to the invention, the pressing mold itself can likewise be heated, for instance, electrically. Even though this can be advantageous, it is not necessary in all cases.

The advantages of the method according to the invention and of the pressing tool according to the invention used there are numerous: the system can respond extremely quickly to temperature fluctuations that occur, for instance, when the cold friction compound mixture is placed into pressing tool, thus ensuring the desired processing temperature (optimizing the temperature constancy in the pressing cavity). The temperature differences over the heated surfaces are minimal and amount to just a few degrees. Moreover, the pressing process itself can be shortened since the friction compound is brought up to the desired processing temperature more quickly and more uniformly, at the same time, ensuring a constant product quality and avoiding reject batches. These aspects are of great importance, particularly in terms of industrial serial production and cost considerations.

DETAILED DESCRIPTION OF THE INVENTION

Figure 1:
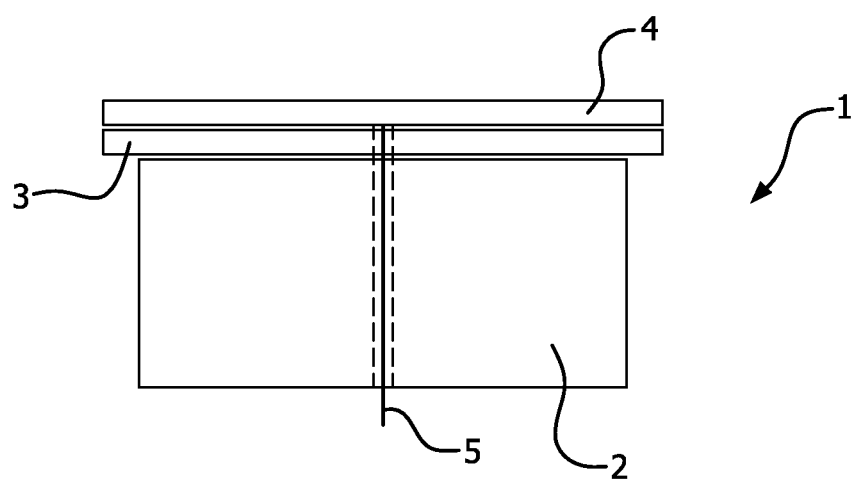
FIG. 1 is a side elevational view of a pressing die according to the invention.

FIG. 1 shows a possible embodiment of a pressing die 1 according to the invention, having a foot 2 on which there can be a metallic die plate or pressure plate 6 (shown in FIG. 2), an insulation plate 3, and a heating plate 4a with an electric connection 5.

An analogous arrangement is possible for the mirror plate. Here, the die foot 2 is replaced by the (metallic) mirror plate.

In another advantageous embodiment of the invention, a so-called profile plate 6 can be placed on the separate heating plate of the pressing die, said profile plate then being in direct contact with the pressing material during the pressing procedure. The profile plate is then situated on the surface of the heating plate facing away from the die foot 2 in FIG. 1.

The profile plate can be joined to the die foot in a simple manner via the preferably ceramic heating plate. This can be done, for example, by drilling holes into the heating plate so that the profile plate can be screwed onto the die foot. As a result, the heating plate 4a is clamped between the profile plate 6 and the die foot 2 or an insulation plate 3 that might be present.

The profile plate is fastened to the preferably ceramic heating plate primarily so that—by means of pre-tension that is thus created in the heating plate—bending and shear stresses on the heating plate are prevented during the pressing procedure. This markedly reduces the mechanical loads, especially of a ceramic heating plate that has been placed on the pressing die. Moreover, under some circumstances, it is possible to dispense with a change in the geometry of the ceramic heating plate, for example, in the case of minor changes in the geometry of the pressing mold, and only the profile plate, which does not have any electric connections for the heating, is adapted accordingly. Thanks to the use according to the invention of such a profile plate, it is thus possible to even further reduce the costs and the downtimes of a pressing installation.

The profile plate according to the invention is made of a material that is suitable for the described pressing tool. Preferably, steel is used, especially steel with a high degree of hardness, for example, in the form of a nitrated profile plate. Owing to the resistance to wear and tear of such a profile plate steel, the service life of a pressing die equipped in this manner can be markedly increased.

Moreover, chrome plating, or more generally a surface treatment, for example, of the profile plate serves to largely prevent adhesion of the pressing material to the pressing surface if the steel has a sufficiently high degree of basic hardness.

The thickness of the profile plate is probably in the order of magnitude of the thickness of the heating plate; in particular, the profile plate has a thickness of 2 mm to 10 mm.

In another advantageous embodiment of the present invention, a profile plate can be additionally installed on the preferably ceramic heating plate that is situated on the mirror plate. The statements made above about a profile plate on the heating plate of the pressing die apply accordingly.

The mechanical durability of the pressing tool and thus its service life are increased through the use of profile plates to cover the (ceramic) heating plates on the pressing die and/or on the mirror plate—whereby then, these profile plates(s) is/are in direct contact with the pressing material during the pressing procedure. The (fewer) drawbacks associated with this and the other advantages of the pressing tool and of the method according to the invention in comparison to an embodiment of the invention in which the heating plate is in direct contact with the pressing material during the pressing procedure should be weighed against the described additional advantages of the use of profile plates. A suitable selection of heating plates and profile plates, however, can also ensure that, even when profile plates are used, the system according to the invention continues to respond quickly, for instance, to temperature fluctuations, and the temperature differences over the indirectly heatable surface (profile plates) are sufficiently small, as a result of which, in comparison to the state of the art, the pressing procedure can be shortened and the pressing material is brought to the desired temperature more quickly and more uniformly, thereby ensuring a constant product quality.

Figure 2:
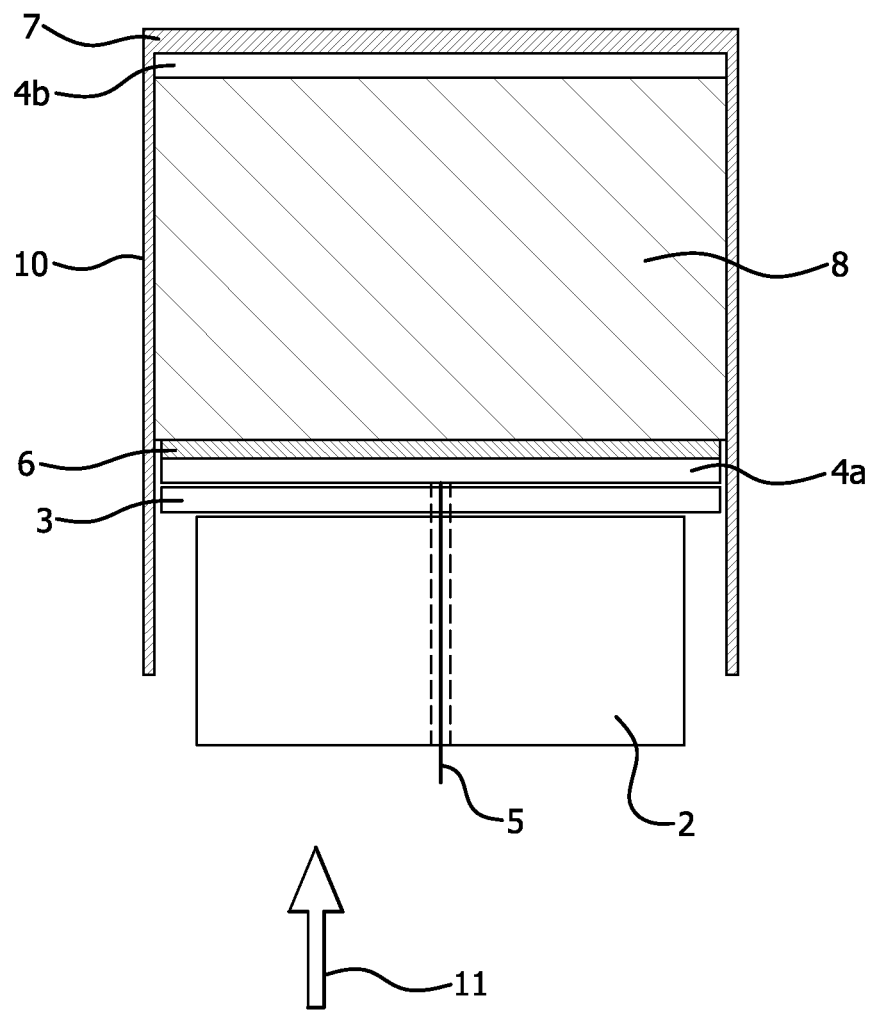
FIG. 2 is a side elevational view of the pressing die of FIG. 1 with a mold.

Referring to FIG. 2, a pressing tool for the production of a friction lining has a die 1 (FIG. 1) in a mold 10. The mold has a mirror plate 7. The die 1 and the mirror plate 7 have separate heating plates 4a, 4b with a first heating plate 4a associated with the die 1 and a second heating plate 4b associated with the mirror plate 7 that come into contact with the pressing material 8 during the pressing procedure. A profile plate 6 can additionally be placed on the first heating plate 4a of the die, and is in contact with pressing material 8 during the pressing procedure. The second heating plate 4b of the mirror plate 7 and the profile plate 6 (if present) on the first heating plate 4a of the die are in contact with the friction lining forming material 8 that is pressed in the pressing tool.

A friction lining is made by filling a friction lining forming material 8 into a mold 10 of a pressing tool. The pressing tool has a die 1, a mirror plate 7, a first heating plate 4a associated with the die and a second heating plate 4b associated with the mirror plate, and a profile plate 6 on the first heating plate of the die. The second heating plate 4b of the mirror plate 7 and the profile plate 6 on the first heating plate 4a of the die are in contact with the friction lining forming material 8. The friction lining forming material is compressed against the profile plate 6 by advancing the die 1 in the pressing direction (shown by arrow 11 in FIG. 2). The the first heating plate 4a and the second heating plate 4b are activated (such as by resistive heating) to heat the friction lining material 8 in the mold 10.

The features according to the invention can be combined in any technically meaningful manner in order to attain the objective according to the invention. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

REFERENCE LIST 1 pressing die
2 foot
3 insulation plate
4a, 4b heating plate
5 electric connection
6 profile plate
7 mirror plate
8 pressing material/friction lining forming material
10 mold
11 pressing direction

The invention claimed is:

1. A pressing tool for the production of a friction lining, comprising:
   a mold,
   a die,
   a mirror plate that is immovable with respect to the mold,
   a first heating plate associated with the die, said first heating plate made of ceramic material,
   a second heating plate associated with the mirror plate, and
   a profile plate on the first heating plate of the die,
   wherein the second heating plate on the mirror plate and the profile plate on the first heating plate of the die are in contact with the friction lining forming material that is pressed in the pressing tool.

2. The pressing tool according to claim 1, wherein the first and second heating plates are thermally and/or electrically insulated in respect of the die and the mirror plate.

3. The pressing tool according to claim 1, wherein both the first and second heating plates are made of ceramic material.

4. The pressing tool according to claim 3, wherein the ceramic material is silicon nitride.

5. The pressing tool according to claim 1, wherein the first and second heating plates each have a thickness of between 3 mm and 10 mm.

6. The pressing tool according to claim 1, wherein the first and second heating plates each have a heating output between 100 W and 10,000 W.

7. The pressing toot according to claim 1, wherein the first and second heating plates each have a surface output of up to 150 W/cm$^2$.

8. The pressing tool according to claim 1, wherein the first heating plate and the profile plate on the die are permeable to gases and vapors.

9. The pressing tool according to claim 1, wherein the profile plate is made of steel and has a thickness of 2 mm to 10 mm.

10. The pressing tool of claim 1, wherein the profile plate maintains a uniform heating profile with temperature differences of not more than a few degrees across its surface in contact with the friction lining forming material.

11. The pressing tool of claim 1, wherein the profile plate is joined to the first heating plate in a manner to pretension the heating plate.

12. The pressing tool of claim 1, further comprising a second profile plate on the second heating plate of the die in contact with the friction lining forming material that is pressed in the pressing tool.

* * * * *